United States Patent [19]

Tazawa

[11] Patent Number: 5,489,248
[45] Date of Patent: Feb. 6, 1996

[54] SHIFT CONTROL SYSTEM FOR AUTOMATIC TRANSMISSION

[75] Inventor: Mitsugi Tazawa, Fuji, Japan

[73] Assignee: Jatco Corporation, Fuji, Japan

[21] Appl. No.: 319,542

[22] Filed: Oct. 7, 1994

[30] Foreign Application Priority Data

Oct. 8, 1993 [JP] Japan ................................. 5-252719

[51] Int. Cl.⁶ ................................................. F16M 61/08
[52] U.S. Cl. ......................... 477/148; 477/143; 477/156
[58] Field of Search .................................... 477/148, 149, 477/154, 155, 121, 143, 156, 164; 475/118, 121, 128

[56] References Cited

U.S. PATENT DOCUMENTS

| | | | |
|---|---|---|---|
| 4,867,194 | 9/1989 | Hayasaki et al. | 137/118 |
| 5,069,085 | 12/1991 | Iizuka | 477/119 |
| 5,079,972 | 1/1992 | Iizuka | 477/155 X |
| 5,086,889 | 2/1992 | Nobumoto et al. | 477/174 X |
| 5,089,963 | 2/1992 | Takahashi | 477/143 X |
| 5,166,879 | 11/1992 | Greene et al. | 477/129 X |
| 5,247,859 | 9/1993 | Augus et al. | 477/129 |
| 5,434,780 | 7/1995 | Kume et al. | 477/148 X |

Primary Examiner—Charles A. Marmor
Assistant Examiner—Peter Kwon
Attorney, Agent, or Firm—Foley & Lardner

[57] ABSTRACT

A shift control system for an automatic power transmission is capable of optimizing operation timing of a timing valve and whereby eliminate a shift-shock and occurrence of racing. The system includes an input device including a detector for detecting a vehicle speed and a load detector for detecting an engine load, a switching device for switching states of the friction elements for establishing the transmission speed ratios, a switching controller for selecting a transmission speed ratio among the speed ratios on the basis of the inputs from the input device and issuing a shifting demand for the switching device, a measuring device for measuring an elapsed time from a timing of recognition of the shifting demand from the switching controller, a timing adjusting device for adjusting response of hydraulic pressure supply for the friction elements upon down-shifting, a weighting and summing derive for deriving weighted sum of inputs including at least the vehicle speed, the elapsed time from the timing of recognition of the shifting demand and the engine load, upon down-shifting, and a timing control device for outputting a control signal to operate the timing adjusting devicee to perform a predetermined operation when the weighted sum derived by the weighting and summing device exceeds a predetermined threshold value.

12 Claims, 10 Drawing Sheets

| GEAR POSITION \ SOLENOID | SHIFT SOLENOID A | SHIFT SOLENOID B |
|---|---|---|
| 1ST | ○ | ○ |
| 2ND | × | ○ |
| 3RD | × | × |
| 4TH | ○ | × |

| SHIFT POSITION | | R/C | H/C | F/C | O/C | BAND SERVO | | | F/O C | F/O C | L&R/C |
|---|---|---|---|---|---|---|---|---|---|---|---|
| | | | | | | 2ND APPLY | 3RD RELEASE | 4TH APPLY | | | |
| P | | | | | | | | | | | |
| R | | ○ | | | | | | | | | ○ |
| D | 1ST | | | ○ | △ | | | | ● | | |
| D | 2ND | | | ○ | ○ | ○ | | | ● | | |
| D | 3RD | | ○ | ○ | ○ | × | × | | ● | ● | |
| D | 4TH | | ○ | × | △ | × | × | ○ | | | |
| 2 | 1ST | | | ○ | △ | | | | ● | ● | |
| 2 | 2ND | | | ○ | ◎ | ○ | | | ● | | |
| 1 | 1ST | | | ○ | ○ | ○ | | | ● | | ○ |
| 1 | 2ND | | | ○ | ○ | ○ | | | ● | | |

SHIFT CONTROL SYSTEM FOR AUTOMATIC TRANSMISSION

BACKGROUND OF THE INVENTION

1. Field of the Invention

The present invention relates generally to a shift control system for an automatic transmission for an automotive vehicle. More specifically, the invention relates to a shift control system for controlling timing of shifting of transmission speed ratios.

2. Description of the Related Art

Conventionally, 3-2 timing value control disclosed in U.S. Pat. No. 4,867,194, to Hayasaki et al., issued on Sep. 19, 1989, has been known as a control for shift timing of transmission speed ratios, for example.

The disclosed 3-2 timing valve permits draining of a release pressure for a band servo through a fixed orifice and the 3-2 timing value in the inoperative state (valve communicated condition) and whereby permits quickly lowering of the pressure to quickly engage a band brake. On the other hand, in the operative state (valve blocking condition), the release pressure of the band servo is drained only through the fixed orifice to take a long period for lowering the release pressure so that engaging timing of the band brake can be delayed.

Accordingly, in the kick-down state to cause 3-2 downshifting at depressed condition of an accelerator pedal with large engine output torque, when a vehicle speed is low, an engine speed is to establish synchronous rotation at the input side and output side of the automatic transmission after downshifting in a short period, the 3-2 timing valve is placed in the inoperative state to quickly drain the band servo release pressure and whereby to quickly engage the band brake. On the other hand, when the vehicle speed is high, it inherently takes a certain period to accelerate the engine speed to establish synchronous rotation at the input side and output side of the automatic transmission after down-shifting, the 3-2 timing valve is placed in the operative state to provide a delay for engaging the band brake.

However, in the prior art set forth above, since the engagement timing of the band brake is adjusted only depending upon the vehicle speed. Therefore, it is possible to cause a significant shift-shock or racing of the engine depending upon the vehicle driving condition before occurrence of down-shifting (constant speed traveling or coasting) or depending upon the depression speed (quickly depressed or moderately depressed) of the accelerator pedal.

SUMMARY OF THE INVENTION

In view of the above-mentioned problem in the prior art, it is an object of the present invention to provide a shift control system for an automatic transmission, which can minimize such shift-shock and prevent racing of the engine by appropriately controlling operation timing of a timing valve depending upon a vehicle driving condition.

According to one aspect of the invention, a shift control system for an automatic transmission having a plurality of friction elements for shifting among predetermined speed ratios, comprising:

input means for inputting selected input parameters, and including vehicle speed detecting means for detecting a vehicle speed and load detecting means for detecting an engine load;

switching means for switching states of said friction elements for establishing said predetermined speed ratios;

switching control means for selecting a speed ratio among said speed ratios on the basis of the inputs from said input means and issuing a shifting demand for said switching means;

measuring means for measuring an elapsed time from a timing of recognition of said shifting demand from said switching control means;

timing adjusting means for adjusting response of hydraulic pressure supply for said friction elements upon shifting;

weighting and summing means for deriving a weighted sum of inputs including at least the vehicle speed, the elapsed time from the timing of recognition of the shifting demand and the engine load, upon shifting; and timing control means for outputting a control signal to operate said timing adjusting means to perform predetermined operation when said weighted sum derived by said weighting and summing means exceeds a predetermined threshold value.

According to another aspect of the invention, a shift control system for an automatic transmission having a plurality of friction elements for shifting among predetermined speed ratios, comprising:

input means for inputting selected input parameters, and including vehicle speed detecting means for detecting a vehicle speed and load detecting means for detecting an engine load;

switching means for switching states of said friction elements for establishing said predetermined speed ratios;

switching control means for selecting a speed ratio among said speed ratios on the basis of the inputs from said input means and issuing a shifting demand for said switching means;

measuring means for measuring an elapsed time from a timing of recognition of said shifting demand from said switching control means;

timing adjusting means for adjusting response of hydraulic pressure supply for said friction elements upon down-shifting;

weighting and summing means for deriving a weighted sum of inputs including at least the vehicle speed, the elapsed time from the timing of recognition of the shifting demand and the engine load, upon down-shifting; and timing control means for outputting a control signal to operate said timing adjusting means to perform predetermined operation when said weighted sum derived by said weighting and summing means exceeds a predetermined threshold value.

In the preferred construction, the load detecting means detects a throttle vale open angle of an engine. Also, the weighted summing means may comprise a neural network.

It is preferred that the throttle valve open angle input to the weighting and summing means is the throttle value open angle at a timing before the recognition is made. The weighting and summing means may derive the weighted sum of the vehicle speed, the elapsed time from the timing where the shifting demand is recognized, a throttle valve open angle of the engine, and a throttle valve opening speed. The timing adjusting means may be provided in a circuit parallel to a circuit, in which a fixed orifice is arranged, and including a timing valve for establishing and blocking communication through the circuit where the timing adjusting means is provided, and the timing adjusting means outputs a control signal to operate the timing valve for a predetermined operation. The timing control means may include a switching actuator for a solenoid.

Upon shifting, when the switching control means issues the shifting demand to the switching means, the friction elements in the automatic transmission are operated to cause shifting of the transmission speed ratio.

Among such shifting operations, when a shifting demand from the switching control means to the switching means for down-shifting between predetermined transmission speed ratios is recognized by the recognizing means, the weighting and summing means performs weighting process for the inputs of the vehicle speed, the elapsed time from the timing of recognition of the shifting demand and the engine load to derive a sum of the weighted inputs. The timing control means detects the timing immediately before establishment of synchronized rotation at the input and output sides of the automatic transmission to output the control signal to perform switching operation to make the timing adjusting means to perform the predetermined operation.

It should be noted that, as the weighting and summing means, a neural network is typically employed. The weight coefficient as weight of coupling of neurons can be obtained at an appropriate value by repeatedly leaning until a predetermined convergence reference is satisfied by error back propagation learning. It is possible to preliminarily set the appropriate weight values to the weighting and summing means by preliminarily performing learning, in advance of installation of the shift control system according to the invention to the vehicle. It is also possible to make the weighting and summing means to perform the learning after installation of the system to the vehicle.

Also, as the load detecting means, the throttle open angle sensor is employed. Namely, by employing the most typical input means as an input means for the switching control means, high general applicability can be achieved.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.
(Construction of Preferred Embodiment)

Figure 1:
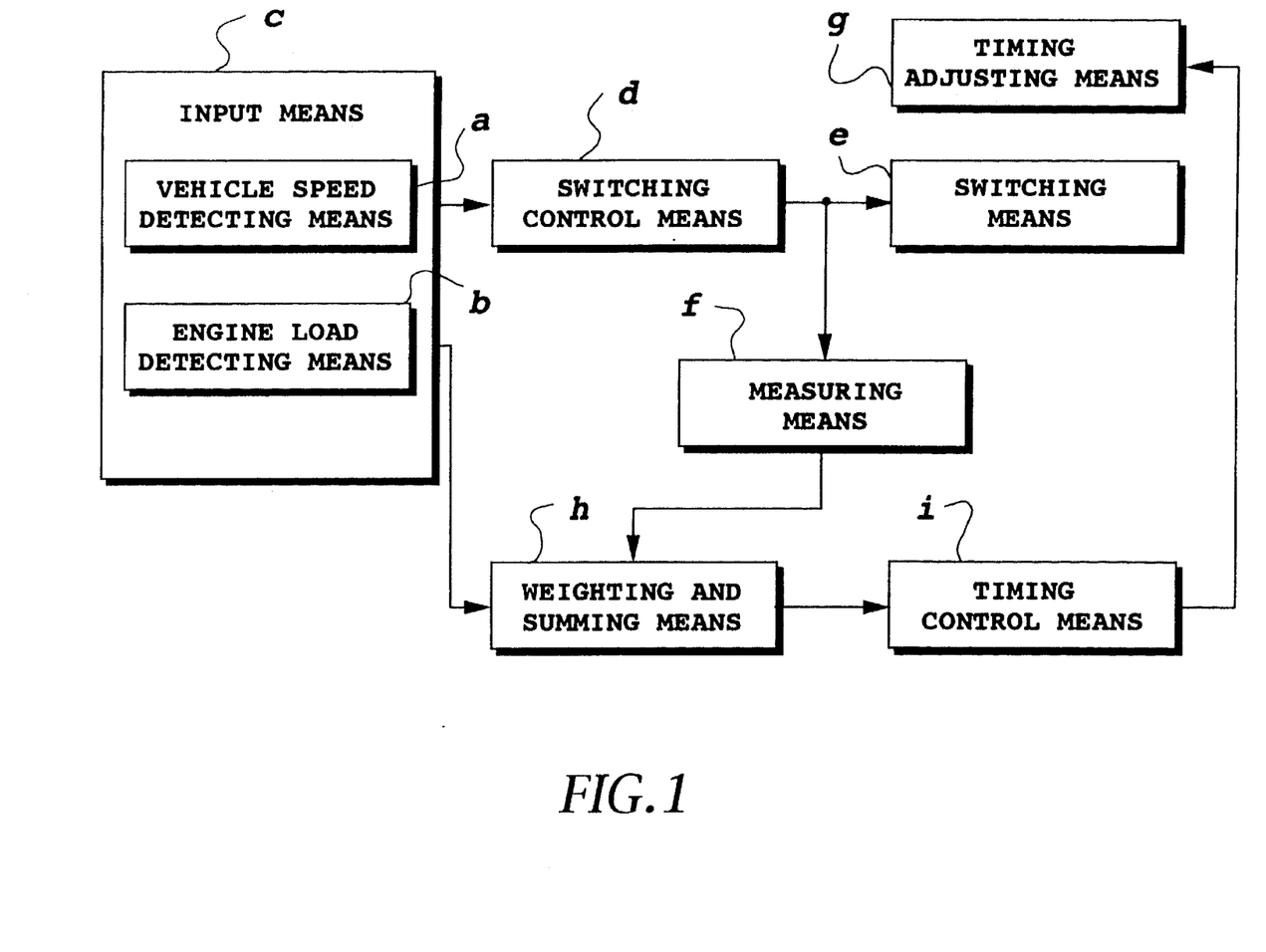
FIG. 1 is a block diagram showing one embodiment of control circuit in a shift control system for an automatic transmission according to the present invention.
Figure 2:
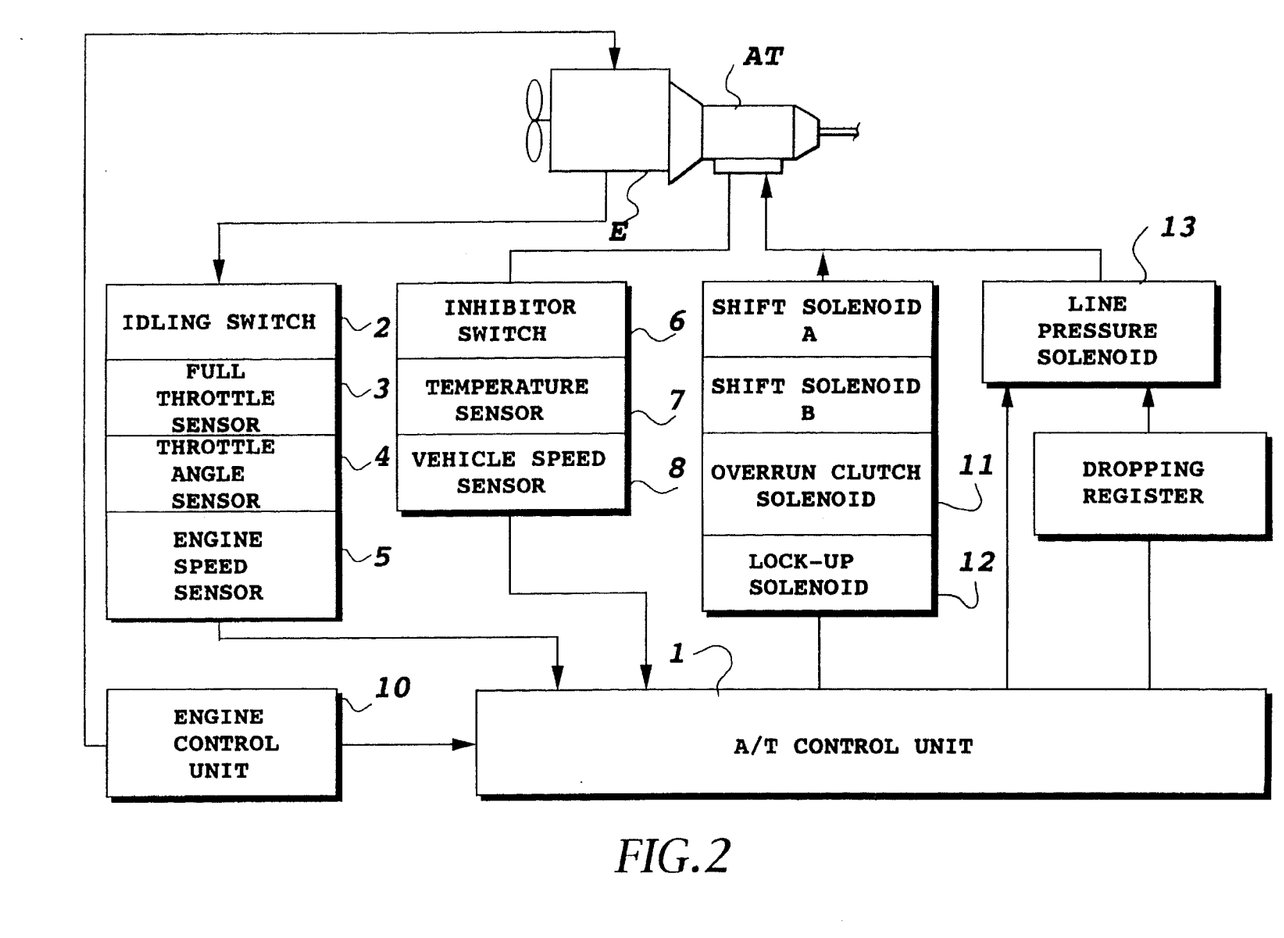
FIG. 2 is a schematic block diagram showing an overall construction of the preferred embodiment of a shift control system for an automatic transmission according the present invention.
Figure 3:
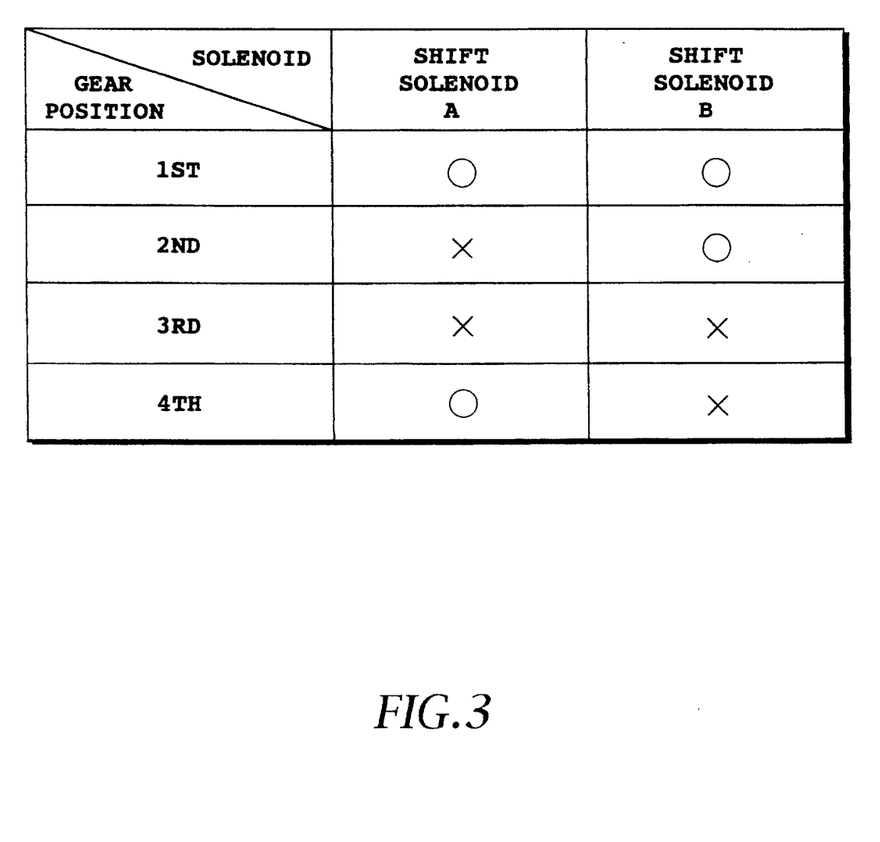
FIG. 3 is a table showing switching characteristics of shift solenoids A and B employed in the preferred embodiment of the shift control system according to the present invention.

FIG. 2 shows a overall construction of the preferred embodiment of a shift control system for an automatic power transmission according to the present invention. An A/T control unit 1 incorporating a microcomputer is connected to an idling switch 2, a full-throttle switch 3, a throttle angle sensor 4 and an engine speed sensor 5 for monitoring the operating condition of the engine, an inhibitor switch 6, a temperature sensor 7 of an automatic power transmission A/T and a vehicle speed sensor 8. The A/T control unit 1 is communicated with an engine control unit 10 controlling the engine for exchanging signals. The A/T control unit 1 controls shifting actuators, such as two shift solenoids A and B, an overrun clutch solenoid 11, a lock-up solenoid 12 and a line pressure solenoid 13 for operating clutches, brakes and friction elements which will be discussed later, for establishing various transmission speed ratios. In the shown embodiment, the automatic power transmission is designed for performing automatic shifting of the transmission speed ratio among four forward speed ratios and one reverse speed ratio. It should be noted that, upon shifting control, by combinations of ON and OFF of the shift solenoids A and B according to the shifting characteristics illustrated in FIG. 3, positions of shift valves are switched for establishing desired transmission speed ratios. In FIG. 3, the reference character "○" represents ON state and "x" represents OFF state of the relevant shift solenoid.

Figure 4:
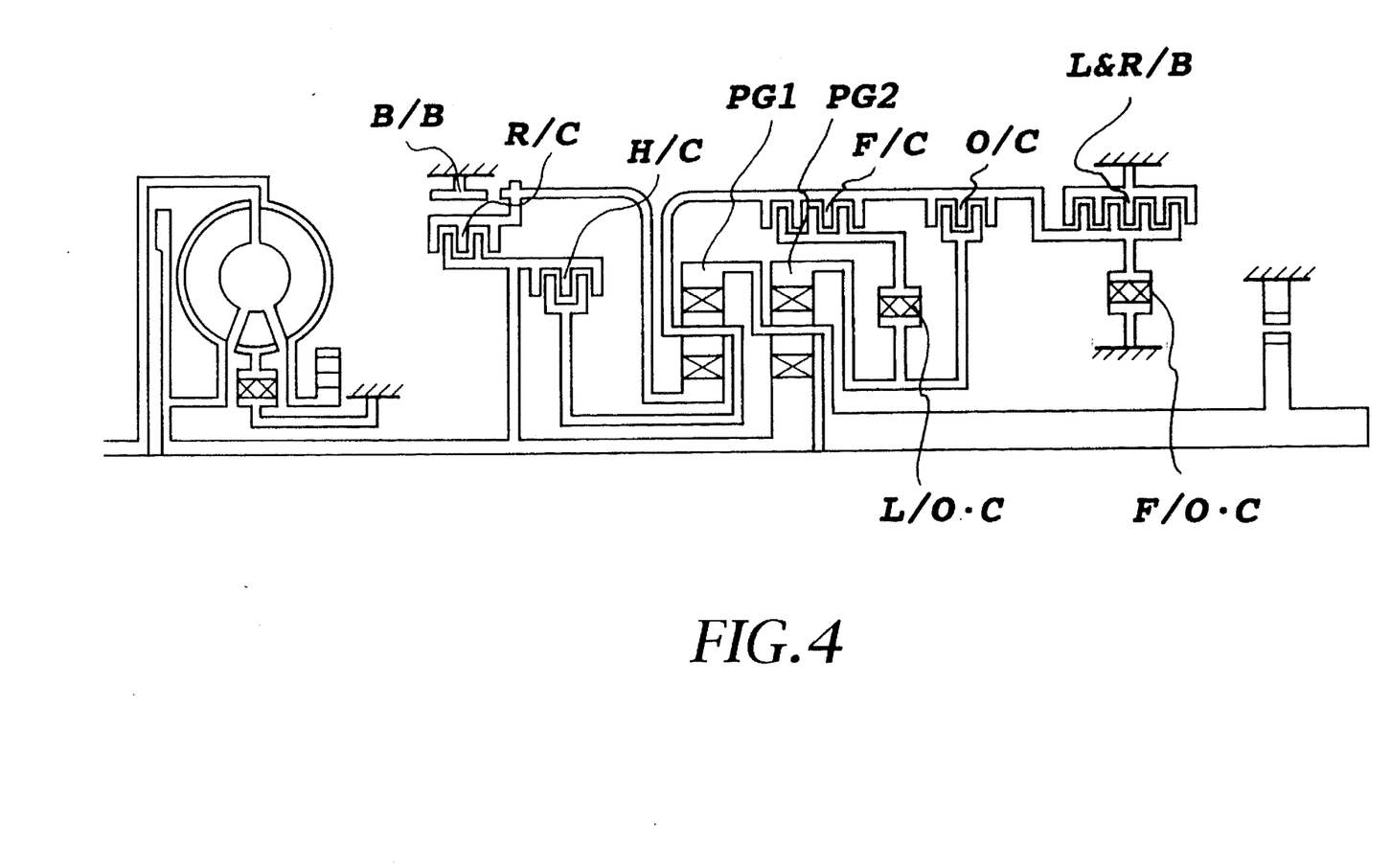
FIG. 4 is a skeleton diagram showing a gear train of the automatic transmission employed in the preferred embodiment of the shift control system.
Figure 5:
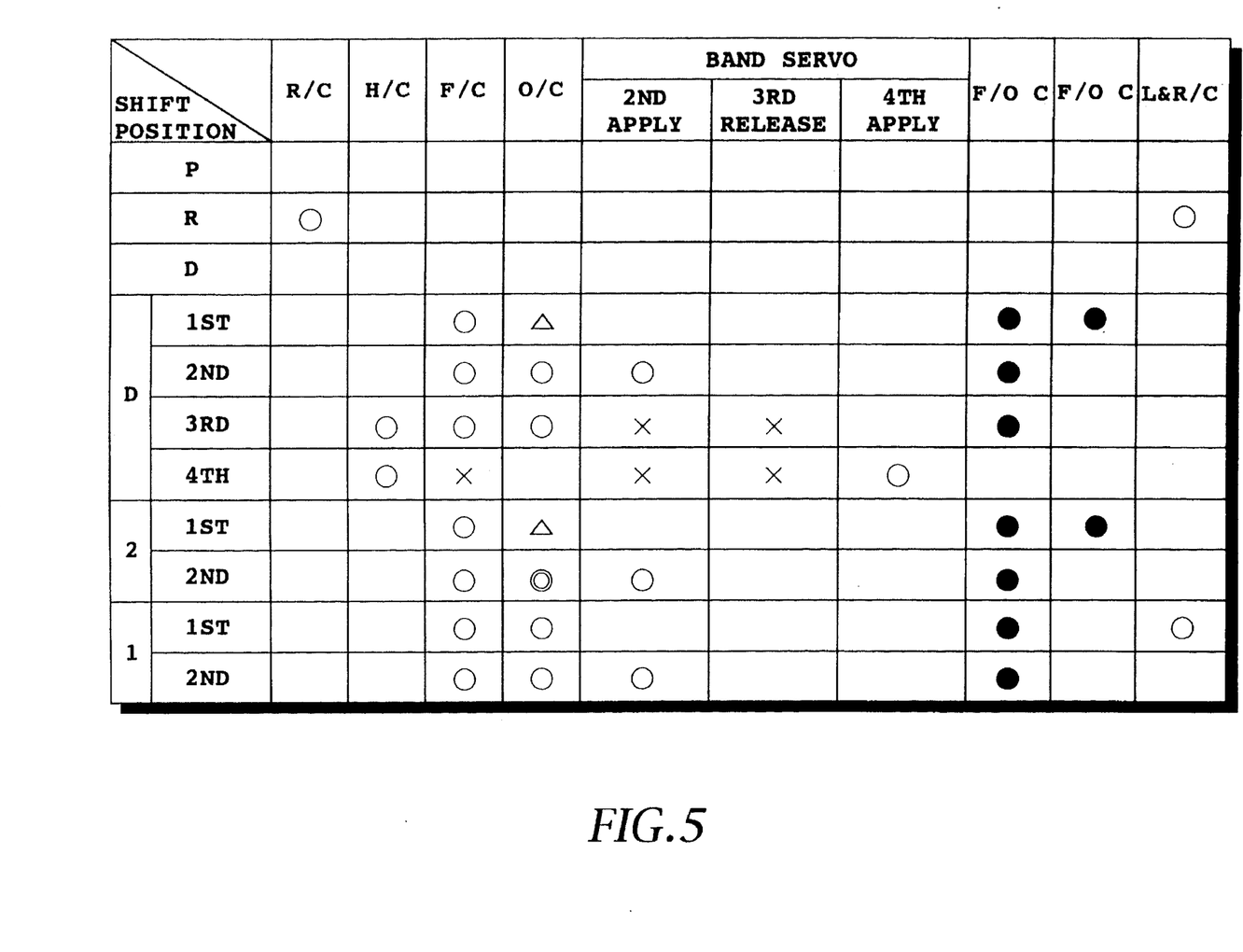
FIG. 5 is a table showing engagement/release characteristics of friction elements employed in the preferred embodiment of the shift control system.

Next, in order to establish four forward speed ratios and one reverse speed ratio, a gear train of the shown embodiment of the automatic power transmission AT comprises two planetary gear sets PG1 and PG2, four multi-plate clutches R/C, H/C, F/C and O/C, one band brake B/B, one set of multi-plate brake L&R/B and two sets of one-way clutches F/O C and L/O C, such as, planetary gear sets PG1 and PG2, a reverse clutch R/C, a high clutch H/C, a forward clutch F/C, an overrun clutch O/C, a band brake B/B, a forward one-way clutch F/O C, a low one-way clutch L/O C, a low and reverse brake L&R/B. By engaging and releasing these friction elements according to the combinations shown in FIG. 5, various transmission speed ratios can be established.

The shifting operation and active gear train at respective transmission speed ratios have been known in the art, such as that disclosed in the above-identified U.S. Pat. No. 4,867,194. The disclosure of the U. S. Pat. No. 4,867,194 is herein incorporated by reference. It should be noted, in FIG. 5 the reference character, "◯" represents engaged state, "●" represents that to be engaged while acceleration, "◉" represents that to be engaged at a throttle angular position smaller than or equal to a set throttle open angle for effecting engine brake, and "x" represents that is engaged but does not contribute power transmission, "Δ" represents that to be engaged at a throttle angular position smaller than or equal to a set throttle open angle but not effective for engine brake.

Figure 6:
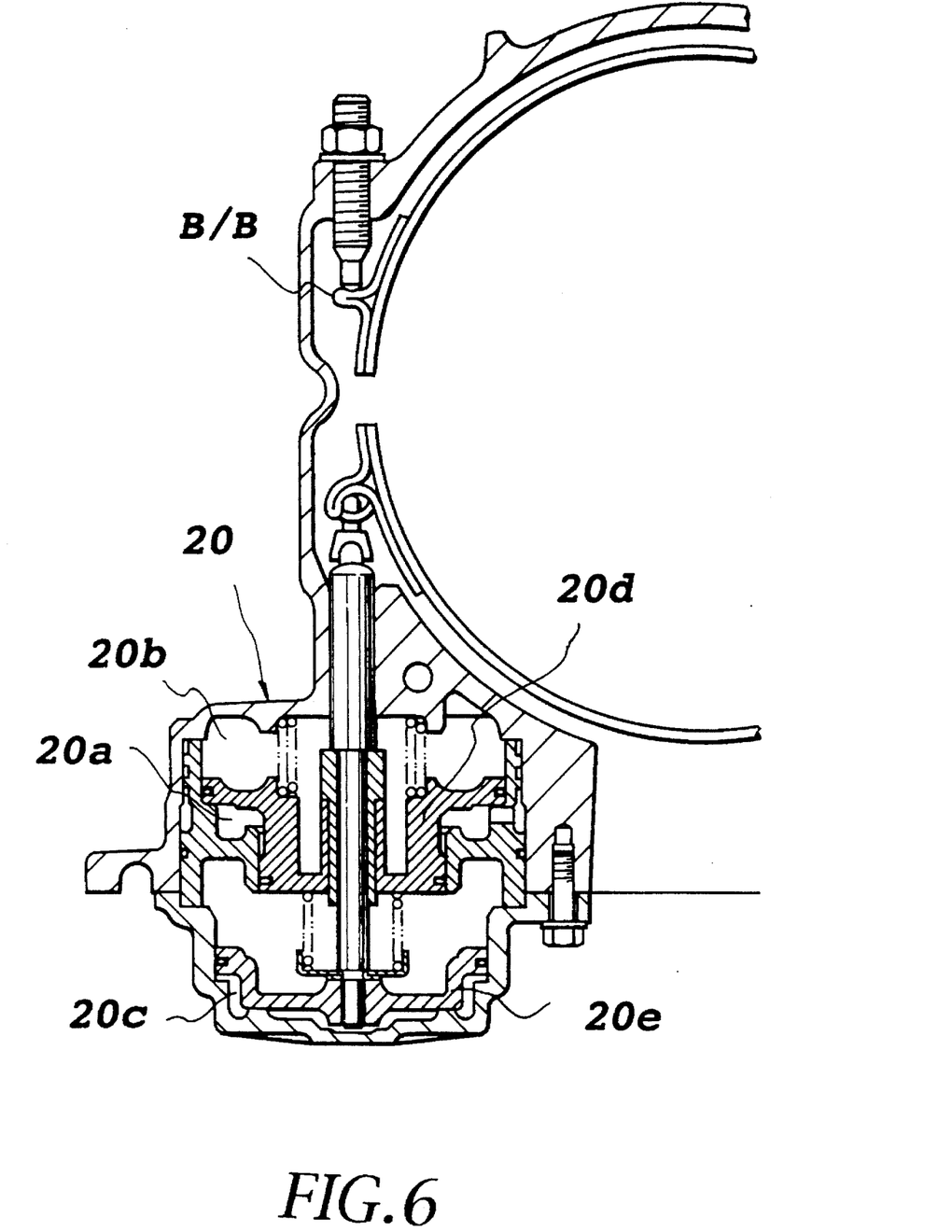
FIG. 6 is a partial section showing the construction of a band servo mechanism to be employed in the preferred embodiment of the shift control system.

The band brake B/B is operated by a band servo 20 illustrated in FIG. 6. The band servo 20 supplies an actuation pressure to a second speed servo apply chamber 20a via a first servo piston 20d for engaging the band brake B/B when the second speed ratio is selected. On the other hand, the band servo 20 supplies the actuation pressure to a third speed servo release chamber 20b for releasing the band brake B/B by an actuation force difference at the first servo piston 20d having different effective areas when the third speed ratio is selected. When the fourth speed ratio is selected, the actuation pressure is supplied to the second speed servo apply chamber 20a, the third speed servo release chamber 20b and a fourth speed servo apply chamber 20c to establish engagement of the band brake B/B via the first servo piston 20d and a second servo piston 20e. Such construction of the band brake B/B has been known in the art. As set forth above, in the shown construction, forces to operate the band brake B/B is differentiated at the second speed ratio and the fourth speed ratio to adapt to an engine output torque for suppressing a shift shock.

Figure 7:
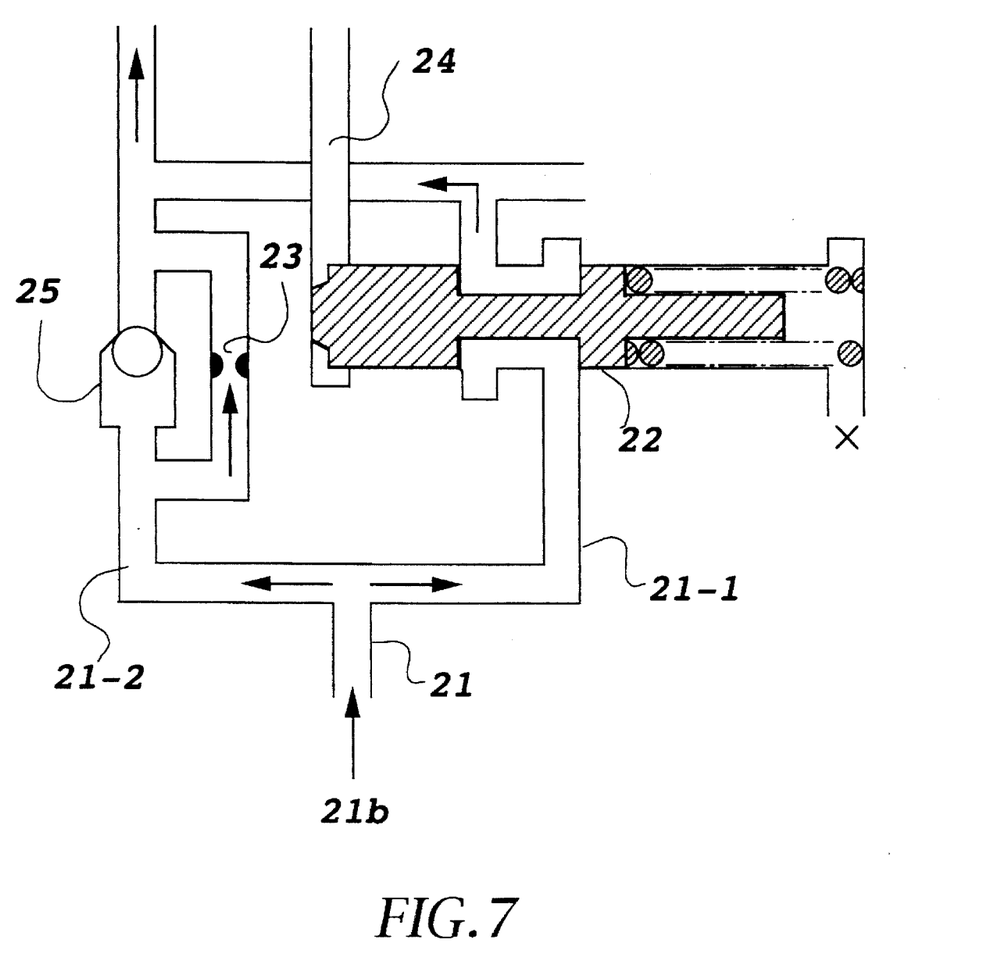
FIG. 7 is a hydraulic circuit diagram showing the major part of the preferred embodiment of the shift control system.

Further, in the control valves of the automatic power transmission A/T, at the intermediate position in a circuit 21 for draining the actuation pressure of the third speed servo release chamber 20b, in the form of a spool 3-2 timing valve (hereinafter referred to as "timing valve") 22 and a fixed orifice 23 are provided in parallel relationship to each other. The timing valve 22 is placed in a communicating position in the inoperative state so that the actuation pressure can be drained quickly, and is placed in a blocking position in the operative state so that the actuation pressure is drained only through the fixed orifice 23 for moderately lowering the actuation pressure. The timing valve 22 is adapted to be placed at the operative state when the overrun clutch solenoid 11 is ON and the throttle open angle is large by receiving a pilot pressure in a circuit 24 from a shuttle valve (not shown). It should be noted that an one-way valve 25 is provided in parallel to the fixed orifice 23.

Next, in the shown embodiment, in the A/T control unit 1, upon down-shifting from the third speed ratio to the second speed ratio, a timing immediately before synchronous rotation of an input side and an output side of the automatic power transmission is detected at a high precision and a timing for draining the actuation pressure from the third speed servo release chamber 20b of the band servo 20 is controlled in association therewith. Detailed discussion will be given herebelow with respect to the timing control.

Figure 8:
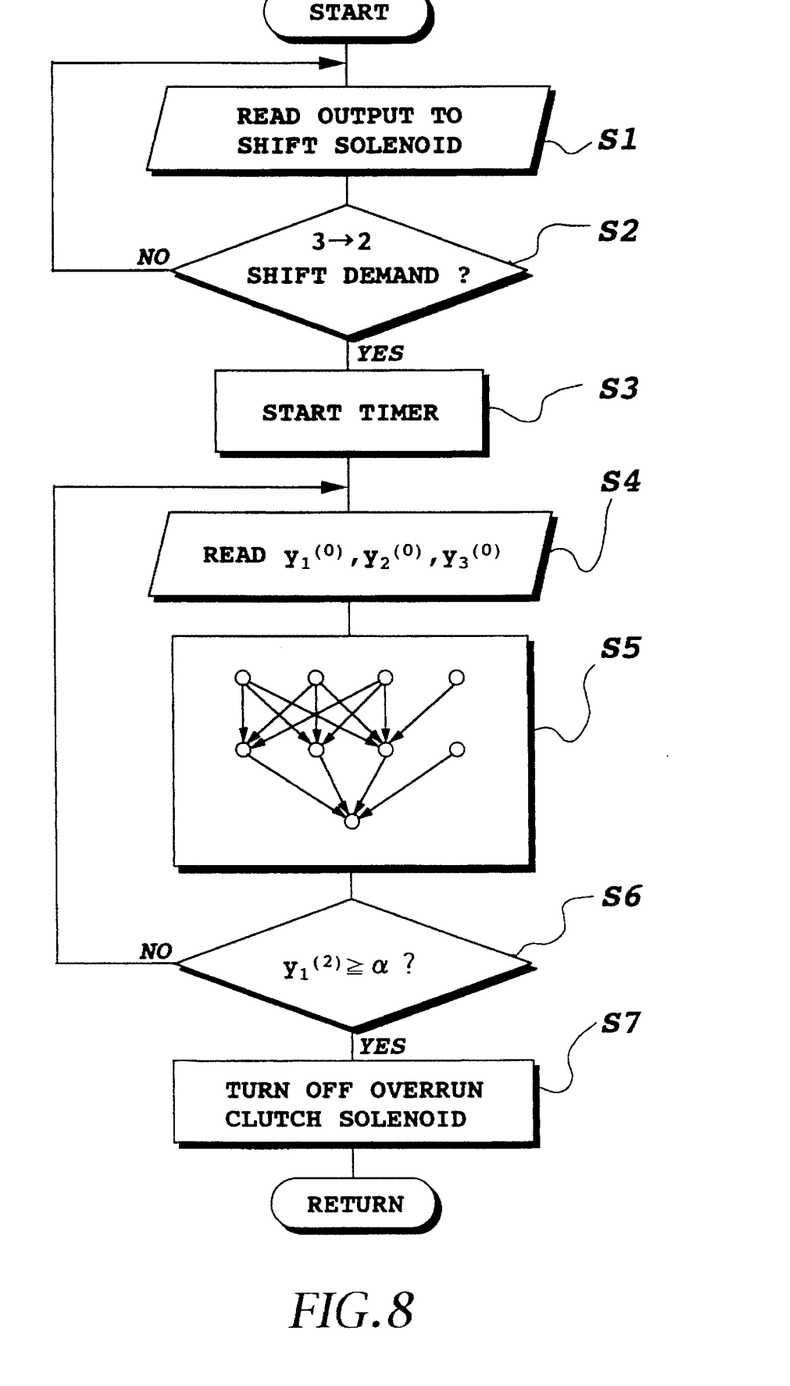
FIG. 8 is a flowchart showing a process of timing, control in an A/T control unit in the preferred embodiment of the shift control system.

At first, discussion will be given with reference to the flowchart shown in FIG. 8. At step S1, outputs for respective shift solenoids A and B are read out from the output portion of the A/T control unit 1. It should be noted that a control signal to turn ON the overrun clutch solenoid 11 is output at a timing before 3-2 down-shifting. At this timing, the timing valve 22 is placed in the operative state, namely shutting off the circuit 21-1 when the throttle open angle is large.

At step S2, judgment is made whether the control signal for turning ON only the shift solenoid B from the third speed state where both of the shift solenoids A and B are held OFF, namely whether "down-shifting demand" from the third speed ratio to the second speed ratio is entered or not. If the answer at step S2 is positive, the process is advanced to step S3 and otherwise the process is returned to step S1.

At step S3, measurement of an elapsed time by an internal timer of the A/T control unit 1 is initiated. Namely, the measured period represents an elapsed time $Y_2^{(0)}$ from the timing where the A/T control unit 1 issues the "down-shifting demand". It should be appreciated that, in the A/T control unit 1, the portion to make judgment of steps S2 and S3 serves as measuring means.

At step S4, a vehicle speed $Y_1^{(0)}$ upon recognition of the "down-shifting demand", the elapsed time $Y_2^{(0)}$ and a throttle open angle $Y_3^{(0)}$ at a steady state before recognition of the "down-shifting demand" are read out, respectively.

Figure 9:
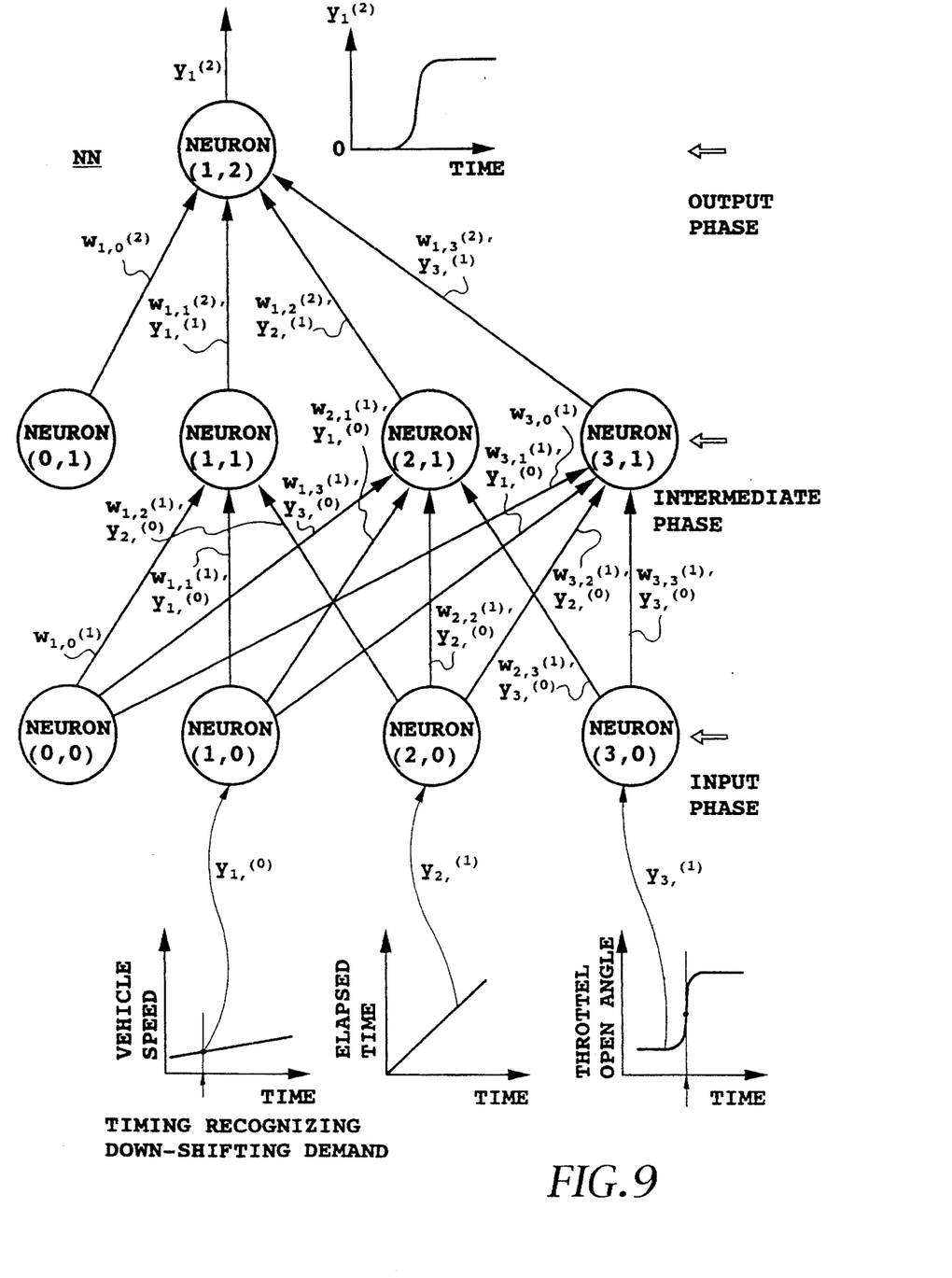
FIG. 9 is a diagrammatic illustration showing a neural network established in the A/T control unit in the preferred embodiment of the shift control system.
Figure 10:
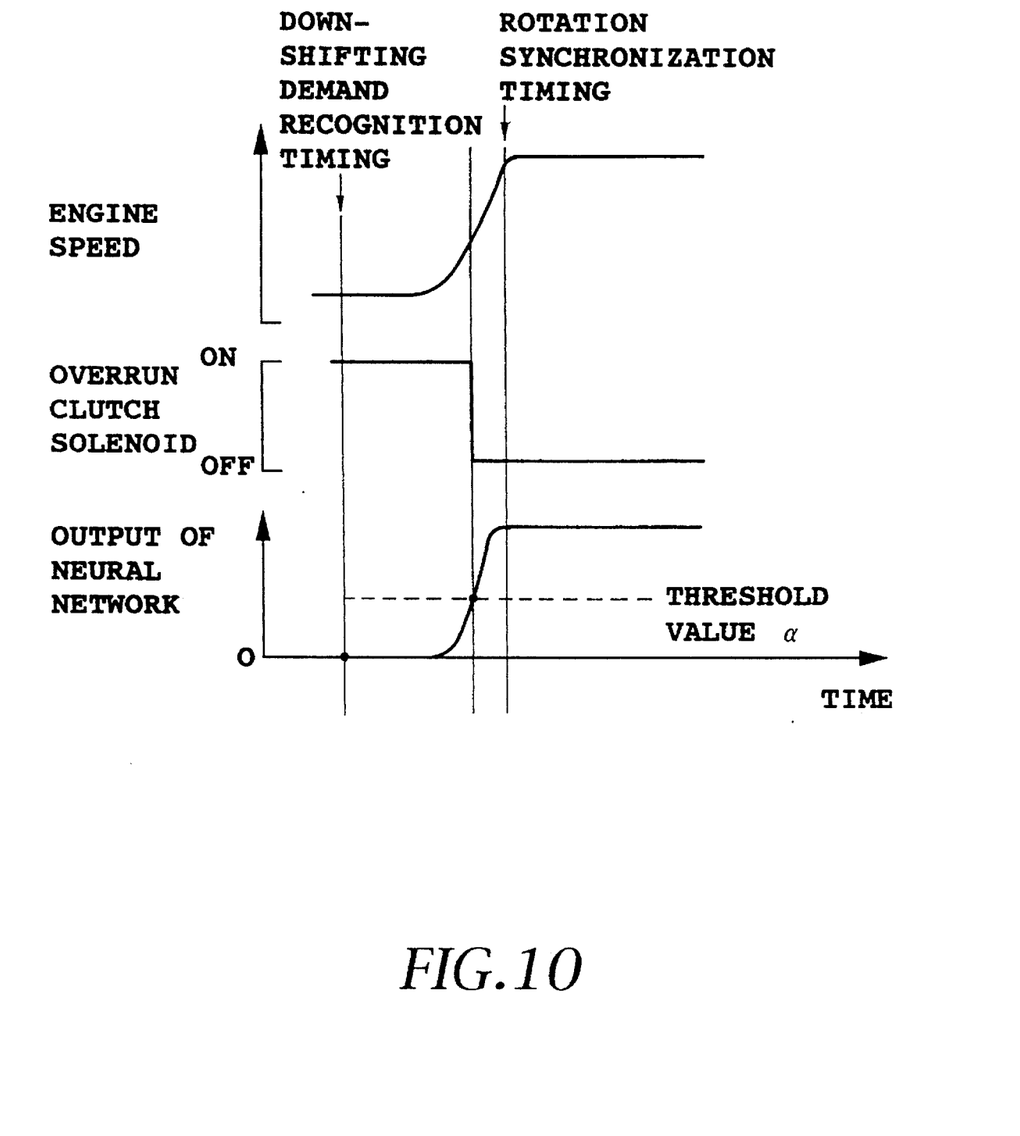
FIG. 10 is a timing chart showing the operation of the preferred embodiment of the shift control system.

At step S5, the elapsed time $Y_2^{(0)}$, the vehicle speed $Y_1^{(0)}$ and the throttle open angle $Y_3^{(0)}$ are input to a neural network NN shown in FIG. 9 and which will be discussed later, to derive a weighted sum $Y_1^{(2)}$. The neural network NN is one example of a weighting and summing means.

At step S6, a judgment is made whether the sum $Y_1^{(2)}$ is greater than or equal to a predetermined threshold value α(in this embodiment, α=0.5 ) . When the answer at step S6 is negative, the process is returned to step S4 and when the answer is positive, the process is advanced to step S7.

At step S7, in the A/T control unit 1, the control signal for the overrun clutch solenoid 11 which is held ON is switched into OFF. Then, application of the pilot pressure of the circuit 24 is terminated to place the timing valve 22 at the inoperative state to place the circuit 21-1 in the communicated condition. Thus, the actuation pressure in the third speed servo release chamber 2b can be quickly drained to establish the second speed engagement of the band brake B/B. The foregoing steps S6 and S7 form a timing control means.

Through the foregoing process, 3-2 timing control is completed.

Next, detailed discussion will be given for the neural network NN discussed with respect to step S5. Namely, in the shown embodiment of the A/T control unit 1, the hierarchy type neural network NN is provided. The hierarchy type neural network NN receives inputs at an input phase and transfer signals in one direction from the input phase to an intermediate phase and from the intermediate phase to an output phase.

With respect to each neuron (neuro element), discussion will be given in order from those in the input phase. In neuron (1, 0) , an input of the vehicle speed $Y_1^{(0)}$ at the timing where the "down-shifting command" is recognized on the basis of the output to the shift solenoids A and B, is received, then, weighting process is performed with weight values $\omega_{1,1}^{(1)}, \omega_{2,1}^{(1)}$ and $\omega_{3,1}^{(1)}$ and thereafter the weighted values are transferred to neuron (1, 1), (2, 1) and (3, 1) in the intermediate phase.

In neuron (2, 0) , an elapsed time $y_2^{(0)}$ from the timing of recognition of the "down-shifting demand" is received at every Δt period and weighting process is performed with weight values $\omega_{1,2}^{(1)}, \omega_{2,2}^{(1)}$ and $\omega_{3,2}^{(1)}$. Then, the weighted values are transferred to neurons (1, 1), (2, 1) and (3, 1) in the intermediate phase.

In neuron (3, 0), the throttle open angle $y_3^{(0)}$ at the steady state before recognition of the "down-shifting demand" is received and weighting process is performed with weight values $\omega_{1,3}^{(1)}, \omega_{2,3}^{(1)}$ and $\omega_{3,3}^{(1)}$. Then, the weight values are transferred to the neurons (1, 1) , (2, 1) and (3, 1) .

In neuron (0, 0) weight values $\omega_{1,0}^{(1)}$, $\omega_{2,0}^{(1)}$ and $\omega_{3,0}^{(1)}$ are output to the neurons (1, 1), (2, 1) and (3, 1).

Next, discussion will be given with respect to the intermediate phase. In neuron (1, 1), non-linear conversion for a sum $x_1^{(1)}$ of the inputs from the input phase is performed to derive ($Y_1^{(1)}$). Then, weighting process is performed with a weight value $\omega_{1,1}^{(2)}$ to output ($\omega_{1,1}^{(2)} y_1^{(1)}$). The sum $x_1^{(1)}$ and $y_1^{(1)}$ can be expressed by the following equations:

$$x_1^{(1)} = \omega_{1,0}^{(1)} + \omega_{1,1}^{(1)} \cdot y_1^{(0)} + \omega_{1,2}^{(1)} \cdot y_2^{(0)} + \omega_{1,3}^{(1)} \cdot y_3^{(0)}$$

$$y_1^{(1)} = 1/\{1+\exp(-x_1^{(1)})\}$$

Also, in neuron (2, 1) non-linear conversion of a sum $x_2^{(1)}$ of the inputs from the input phase is performed to derive ($Y_2^{(1)}$) and further performed weighting process with a weight value $\omega_{1,2}^{(2)}$ to output ($\omega_{1,2}^{(2)} y_2^{(1)}$). The sum $x_2^{(1)}$ and $y_2^{(1)}$ be expressed by the following equations:

$$x_2^{(1)} = \omega_{2,0}^{(1)} + \omega_{2,1}^{(1)} \cdot y_1^{(0)} + \omega_{2,3}^{(1)} \cdot y_2^{(0)} + \omega_{123}^{(1)} \cdot y_3^{(0)}$$

$$y_2^{(1)} = 1/\{1+\exp(-x_2^{(1)})\}$$

In neuron (3, 1) non-linear conversion of a sum $x_3^{(1)}$ of the inputs from the input phase is performed to derive ($Y_3^{(1)}$) and further performed weighting process with a weight value $\omega_{1,3}^{(2)}$ to output ($\omega_{1,3}^{(2)} Y_3^{(1)}$). The sum $x_3^{(1)}$ and $Y_3^{(1)}$ can be expressed by the following equations:

$$x_3^{(1)} = \omega_{3,0}^{(1)} + \omega_{3,1}^{(1)} \cdot y_1^{(0)} + \omega_{3,2}^{(1)} \cdot y_2^{(0)} + \omega_{3,3}^{(1)} \cdot y_3^{(0)}$$

$$y_3^{(1)} = 1/\{1+\exp(-x_3^{(1)})\}$$

Neuron (0, 1) outputs a weight value $\omega_{1,0}^{(2)}$ to neuron (1, 2).

Neuron (1, 2) in the output phase performs non-linear conversion of a sum $x_1^{(2)}$ of inputs from the intermediate phase to output $Y_1^{(2)}$. The sum $x_1^{(2)}$ and $Y_1^{(2)}$ can be expressed by the following equations:

$$x_1^{(2)} = \omega_{1,0}^{(2)} + \omega_{1,1}^{(2)} \cdot y_1^{(1)} + \omega_{1,2}^{(2)} \cdot y_2^{(1)} + \omega_{1,3}^{(2)} \cdot y_3^{(1)}$$

$$y_1^{(2)} = 1/\{1+\exp(-x_1^{(2)})\}$$

In the A/T control unit 1, when the output $Y_1^{(2)}$ of the output phase exceeds a designated predetermined threshold value $\alpha$(0.5 in this embodiment), a judgment is made that it is the timing immediately before synchronous rotation of the input side and the output side to switch the position of the timing valve 22 from the operative state to the inoperative state (namely, in the A/T control unit 1, the output for the overrun clutch solenoid 11 is switched from ON to OFF). By this, draining of the band servo release pressure is switched from the state where it is drained only through the fixed orifice 23 to the state where it is also drained through the timing valve 22 (see FIG. 7) so that the release pressure can be quickly drained to quickly establish engagement of the band brake B/B.

Here, the neural network NN as set forth above, preliminarily determined each weight value upon coupling of neurons in operation. Namely, the neural network NN has a learning phase for modifying the weight values. In the shown embodiment, at the timing before installation to the vehicle, with employing a neural network having the same construction to this neural network NN, the weight values are determined through repeated experiments with applying error back propagation learning.

(Operation of the Embodiment)

Upon down-shifting from the third speed ratio to the second speed ratio, the A/T control unit 1 outputs the control signals for turning ON only shift solenoid B from the state where both of the shift solenoids A and B are held OFF. Then, the fact of outputting of such control signal ("down-shifting demand") is recognized, the instantaneous vehicle speed $Y_1^{(0)}$ at that timing is input, and, in conjunction therewith, measurement of the elapsed time $Y_2^{(0)}$ is initiated. Also, at the same time, the throttle open angle $y_3^{(0)}$ at the steady state before recognition of the "down-shifting demand" is input (processes through steps S1→S2→S3→S4). When the weighted sum $Y_1^{(2)}$ in neuron (1, 2) in the output phase exceeds the threshold value the control signal for turning OFF is output to the overrun clutch solenoid 11 (step S7). The timing where the sum $Y_1^{(2)}$ exceeds the threshold value, is learnt to be the timing immediately before establishment of synchronization of rotations between the input side and the output side of the automatic power transmission.

Accordingly, with the timing set forth above, the timing valve 22 is placed at the inoperative state to quickly drain the actuation pressure in the third speed servo release chamber 20b of the band servo 20 via the timing valve 22 to quickly establish engagement of the band brake B/B associated with turning OFF of the overrun clutch solenoid 11.

As set forth above, in the shown embodiment, upon performing 3-2 down-shifting, for controlling the operation of the timing valve 22 for adjusting the timing to drain the actuation pressure from the third speed servo release chamber 20b of the band servo 20, the timing immediately before establishing of the synchronous rotation between the input side and the output side of the automatic power transmission is determined at high precision according to the procedure obtained through learning of the neural network on the basis of three factors, i.e. the vehicle speed $Y_1^{(0)}$, the elapsed time $Y_2^{(0)}$ from occurrence of "down-shifting demand", and the throttle open angle $Y_3^{(0)}$, to adjust the timing for controlling the timing valve to be operative or inoperative. Therefore, the down-shifting timing can be appropriately controlled at the timing immediately before establishing synchronization of rotation speed at the input side and output side of the automatic power transmission, which timing is variable depending upon the engine driving condition before down-shifting, such as cruising or coasting, throttle open speed and so forth.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, while the shown embodiment employs the neural network as weighting and summing means for deriving the weighted sum of the input relating to the vehicle speed, the elapsed time from the timing of recognition of the down-shifting demand and the engine load, once the respective-weighted values are preliminarily given, it is possible to perform arithmetic operation expressed by the foregoing equations by employing normal Von Neumann type computer to make judgment whether the calculated value exceeds the threshold value.

Also, the number of neurons in the input phase and the intermediate phase in the neural network may be increased. For instance, the variation speed of the throttle open angle may be added as an additional parameter and associating with addition of this, the number of the neurons can be increased.

Furthermore, while the shown embodiment employs the throttle angle sensor as an engine load detecting means for detecting the engine load, it can be replaced with other detecting means, such as an engine speed sensor, an air flow meter, an induction air pressure sensor and so forth.

In addition, while the shown embodiment has discussed for the embodiment, in which shifting is performed according to a predetermined shift schedule, the manner of shifting should not be specified to the disclosed manner but can be any appropriate manners, such as a control employing fuzzy logic.

What is claimed is:

1. A shift control system for an automatic transmission having a plurality of friction elements for shifting among predetermined speed ratios, comprising:
   input means for inputting selected input parameters, and including vehicle speed detecting means for detecting a vehicle speed and load detecting means for detecting an engine load;
   switching means for switching states of said friction elements for establishing said predetermined speed ratios;
   switching control means for selecting a speed ratio among said speed ratios on the basis of the inputs from said input means and issuing a shifting demand for said switching means;
   measuring means for measuring an elapsed time from a timing of recognition of said shifting demand from said switching control means;
   timing adjusting means for adjusting response of hydraulic pressure supply for said friction elements upon shifting;
   weighting and summing means for deriving a weighted sum of inputs including at least the vehicle speed, the elapsed time from the timing of recognition of the shifting demand and the engine load, upon shifting; and
   timing control means for outputting a control signal to operate said timing adjusting means to perform predetermined operation when said weighted sum derived by said weighting and summing means exceeds a predetermined threshold value.

2. A shift control system for an automatic transmission as set forth in claim 1, wherein said load detecting means detects a throttle vale open angle of an engine.

3. A shift control system for an automatic power transmission as set forth in claim 1, wherein said weighted summing means comprises a neural network.

4. A shift control system for an automatic power transmission as set forth in claim 3, wherein the throttle valve open angle input to said weighting and summing means is the throttle value open angle at a timing before said recognition is made.

5. A shift control system for an automatic transmission as set forth in claim 4, wherein said weighting and summing means derives the weighted sum of the vehicle speed, the elapsed time from the timing where said shifting demand is recognized, a throttle valve open angle of the engine, and a throttle valve opening speed.

6. A shift control system for an automatic transmission having a plurality of friction elements for shifting among predetermined speed ratios, comprising:
   input means for inputting selected input parameters, and including vehicle speed detecting means for detecting a vehicle speed and load detecting means for detecting an engine load;
   switching means for switching states of said friction elements for establishing said predetermined speed ratios;
   switching control means for selecting a speed ratio among said speed ratios on the basis of the inputs from said input means and issuing a shifting demand for said switching means;
   measuring means for measuring an elapsed time from a timing of recognition of said shifting demand from said switching control means;
   timing adjusting means for adjusting response of hydraulic pressure supply for said friction elements upon down-shifting;
   weighting and summing means for deriving a weighted sum of inputs including at least the vehicle speed, the elapsed time from the timing of recognition of the shifting demand and the engine load, upon down-shifting; and
   timing control means for outputting a control signal to operate said timing adjusting means to perform predetermined operation when said weighted sum derived by said weighting and summing means exceeds a predetermined threshold value.

7. A shift control system for an automatic transmission as set forth in claim 6, wherein said load detecting means detects a throttle valve open angle of an engine.

8. A shift control system for an automatic power transmission as set forth in claim 6, wherein said weighted summing means comprises a neural network.

9. A shift control system for an automatic power transmission as set forth in claim 8, wherein the throttle valve open angle input to said weighting and summing means is the throttle value open angle at a timing before said recognition is made.

10. A shift control system for an automatic transmission as set forth in claim 9, wherein said weighting and summing means derives the weighted sum of the vehicle speed, the elapsed time from the timing where said shifting demand is recognized, a throttle valve open angle of the engine, and a throttle valve opening speed.

11. A shift control system for an automatic transmission as set forth in claim 10, wherein said timing adjusting means is provided in a circuit parallel to a circuit, in which a fixed orifice is arranged, and including a timing valve for establishing and blocking communication through said circuit where said timing adjusting means is provided, and said timing adjusting means outputs a control signal to operate said timing valve for a predetermined operation.

12. A shift control system for an automatic transmission as set forth in claim 11, wherein said timing control means includes a switching actuator for a solenoid.

* * * * *